United States Patent [19]

Duback et al.

[11] Patent Number: 5,021,018
[45] Date of Patent: Jun. 4, 1991

[54] METHOD FOR MAKING A PANEL ASSEMBLY

[75] Inventors: David W. Duback, Glenview; James R. Vogenthaler, Mount Prospect, both of Ill.

[73] Assignee: Accurate Metering Systems, Inc., Schaumburg, Ill.

[21] Appl. No.: 493,715

[22] Filed: Mar. 15, 1990

Related U.S. Application Data

[62] Division of Ser. No. 155,856, Feb. 16, 1988, Pat. No. 4,928,205.

[51] Int. Cl.$^5$ .............................................. H05K 3/30
[52] U.S. Cl. ........................................ 445/24; 29/833; 408/1 R
[58] Field of Search ................... 445/24; 29/833, 755; 408/1 R, 3

[56] References Cited

U.S. PATENT DOCUMENTS

| | | | |
|---|---|---|---|
| 3,279,871 | 10/1966 | Bright | 361/331 |
| 3,532,893 | 10/1970 | Marantette et al. | 408/3 |
| 3,815,204 | 6/1974 | Feldman et al. | 29/833 |
| 4,741,032 | 4/1988 | Hampton | 361/426 |
| 4,790,694 | 12/1988 | Wilent et al. | 408/1 R |

FOREIGN PATENT DOCUMENTS 0756120 12/1933 France ................................ 361/357
0122788 7/1983 Japan ................................. 361/417

Primary Examiner—Kenneth J. Ramsey
Attorney, Agent, or Firm—Thomas R. Vigil

[57] ABSTRACT

The method for constructing a panel assembly for a control unit comprises the steps of: creating a layout of the system to be controlled in a computer-aided-design system; providing in the layout circle areas for elements of the system to be illuminated to indicate a certain operating mode of the element; creating an overlay of centers for each of the circle areas in the computer-aided-design system; storing in a memory of the computer-aided-design system the layout of the system and a layout of the centers; printing a layout for an overlay of the system to be controlled to a desired scale; printing a layout of the centers to the desired scale; placing the layout of the centers adjacent an outer panel for marking centers thereon; drilling holes at the centers; placing the layout of centers over an inner panel for identifying the centers of the holes to be drilled; drilling holes in the inner panel; mounting light emitting means in the holes drilled in the inner panel; placing the overlay of the system on the outer face of the outer panel with the circle areas thereof in alignment with holes drilled through the outer panel; and storing the graphical representations of the layout of the system and the layout of the centers in the memory of the computer-aided-design system.

6 Claims, 7 Drawing Sheets

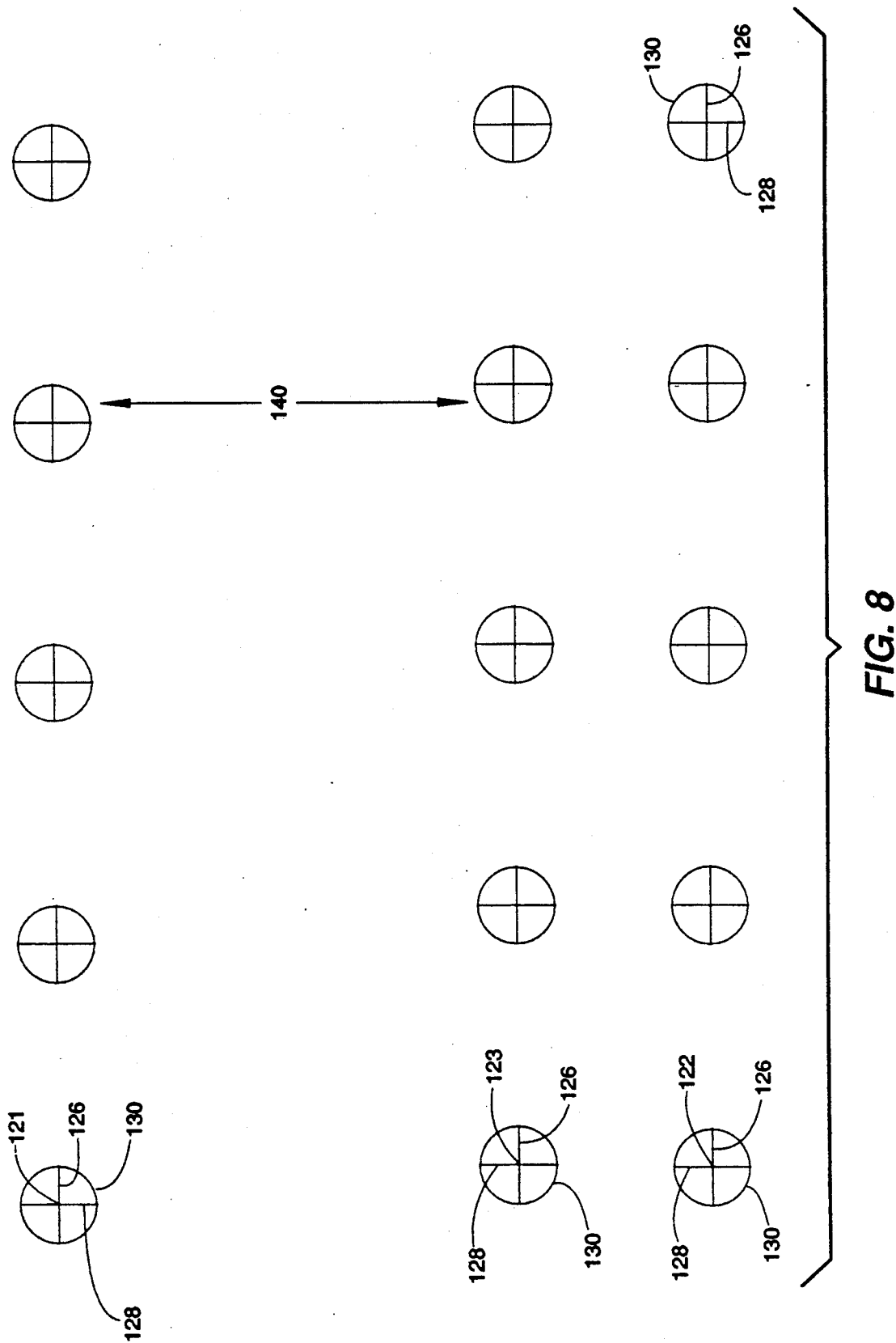

METHOD FOR MAKING A PANEL ASSEMBLY

This is a division of application Ser. No. 155,856, filed 02/16/88, now U.S. Pat. No. 4,928,205.

BACKGROUND OF THE INVENTION

1. Field of the Invention

The present invention relates to panel assemblies, and more particularly to a method, utilizing computer aided design, for creating a panel assembly in such a way that basic components of an assembly drawing can be retained and modified whenever the system to be controlled and illustrated in the panel assembly is modified. The method utilizes digital graphical representations of a layout of the system and a layout overlay of centers for circle areas on the system layout stored in a computer memory. The circle areas are designed to be illuminated to indicate the status of an element in the system to be controlled.

2. Description of the Prior Art

Heretofore layouts of systems to be controlled were created by hand by draftsmen and then center areas for elements to be illuminated in the layout to indicate a particular status of the element were transferred from the layout to a panel. The holes were drilled through the panel for receiving light emitting means.

Typically, whenever the system was modified it was necessary to create a new layout from the old layout manually by hand and then to make new holes in a new panel for the original elements retained and new elements added for which a status indicating light was required.

Usually, the original panel was thrown out and not used in a construction of the new panel. This was most often the case when the manufacturer of the panel assembly was located at a distance from the user of the panel assembly in a control unit.

As will be described in greater detail hereinafter, the method for forming a panel assembly and the panel assembly formed thereby of the present invention utilizing computer aided design enables an originally created panel assembly to be modified and updated without the need to destroy the original panel assembly. This is accomplished by providing an overlay of centers for the circle areas on the layout of the system to be controlled for indicating the status of an element of the system and storing the graphic representation of the system layout and the overlay layout of the centers in a memory such as in a hard disk or a floppy disk in a computer. Then, when the panel assembly is updated, both the layout of the system to be controlled as well as the overlay layout of the centers is updated and the layout of the centers is provided to the customer so that the customer can drill new holes in one or two panels of a panel assembly for the new elements that have been added to the system and for which status indicating lights are required. Also, a new layout of the system to be controlled is provided for mounting to the outer face of an outer panel of the panel assembly. The layout of centers enables holes to be accurately drilled in the outer panel through which light can be directed for illuminating circle areas of elements of the system and whereby new light emitting means can be mounted in the new holes drilled into an inner panel of the panel assembly. In this way, existing panel assemblies constructed according to the teachings of the present invention can be modified as desired without the need to construct a completely new panel assembly.

Examples of prior art housing and panel constructions are disclosed in the following patent publications.

An instrument housing and support is disclosed in the Bright U.S. Pat. No. 3,279,871.

A container for a telephone network interface device is disclosed in the Hampton U.S. Pat. No. 4,741,032.

The Gouverneur French Patent No. 756,120 discloses indicating instruments of a control system mounted at positions behind openings in a hingedly mounted front panel.

A device for mounting an LED to a graphic panel is disclosed in Japanese Patent Publication No. 58-122788.

SUMMARY OF THE INVENTION

According to the present invention there is provided a method for constructing a panel assembly for a control unit comprising:

a control unit housing; an inner panel having a back side and an outer face and being hingedly mounted at one side edge to said control unit housing, said inner panel having a plurality of openings formed therethrough; light emitting means mounted in said openings for projecting light outwardly from the outer face of said inner panel; wire conductor means connected on the back side of said inner panel to the light emitting means and adapted to be connected to a source of electric power; an outer panel having an outer face and an inner face and being hingedly connected along one side thereof to said control unit housing, said outer panel having openings therethrough arranged to be in alignment with said light emitting means mounted in said openings of said inner panel; and said layout of said system being mounted on the outer face of said outer panel and having designated areas over at least some of said openings in said outer panel identifying certain elements of the system illustrated in the layout that have different operating modes, which designated areas are to be illuminated to indicate particular operating modes of the elements in the layout of the system shown on said outer face of said outer panel, said method comprising the steps of:

(a) creating a layout of the system to be controlled in a computer-aided-design system;

(b) providing in said layout circle areas for elements of the system to be illuminated to indicate a certain status of the element;

(c) creating an overlay of centers for each of the circle areas in the computer-aided-design system;

(d) storing in a memory of the computer-aided-design system the layout of the system and a layout of the centers;

(e) printing a layout for an overlay of the system to be controlled to a desired scale;

(f) printing a layout of the centers to the desired scale;

(g) placing the layout of the centers adjacent said outer panel for marking centers thereon;

(h) drilling holes at the centers;

(i) placing the layout of centers over said inner panel for identifying the centers of holes to be drilled;

(j) drilling holes in the inner panel;

(k) mounting said light emitting means in the holes drilled in the inner panel;

(l) placing the overlay of the system on the outer face of the outer panel with circle areas thereof in alignment with the holes drilled through the outer panel; and (m) storing the graphical representations of the layout of the system and the layout of the centers in the memory.

BRIEF DESCRIPTION OF THE DRAWINGS

FIG. 8 is a plan view of the cross hair centers created with the CAD system which is overlayed on the overlay of FIG. 6 to form an overlay with cross hair centers as shown in FIG. 7 and which is used for locating the position of the holes in the outer panel shown in FIG. 3 sand the mounting positions for lamps mounted to the inner panel shown in FIG. 3.

DESCRIPTION OF THE PREFERRED EMBODIMENT

Figure 1:
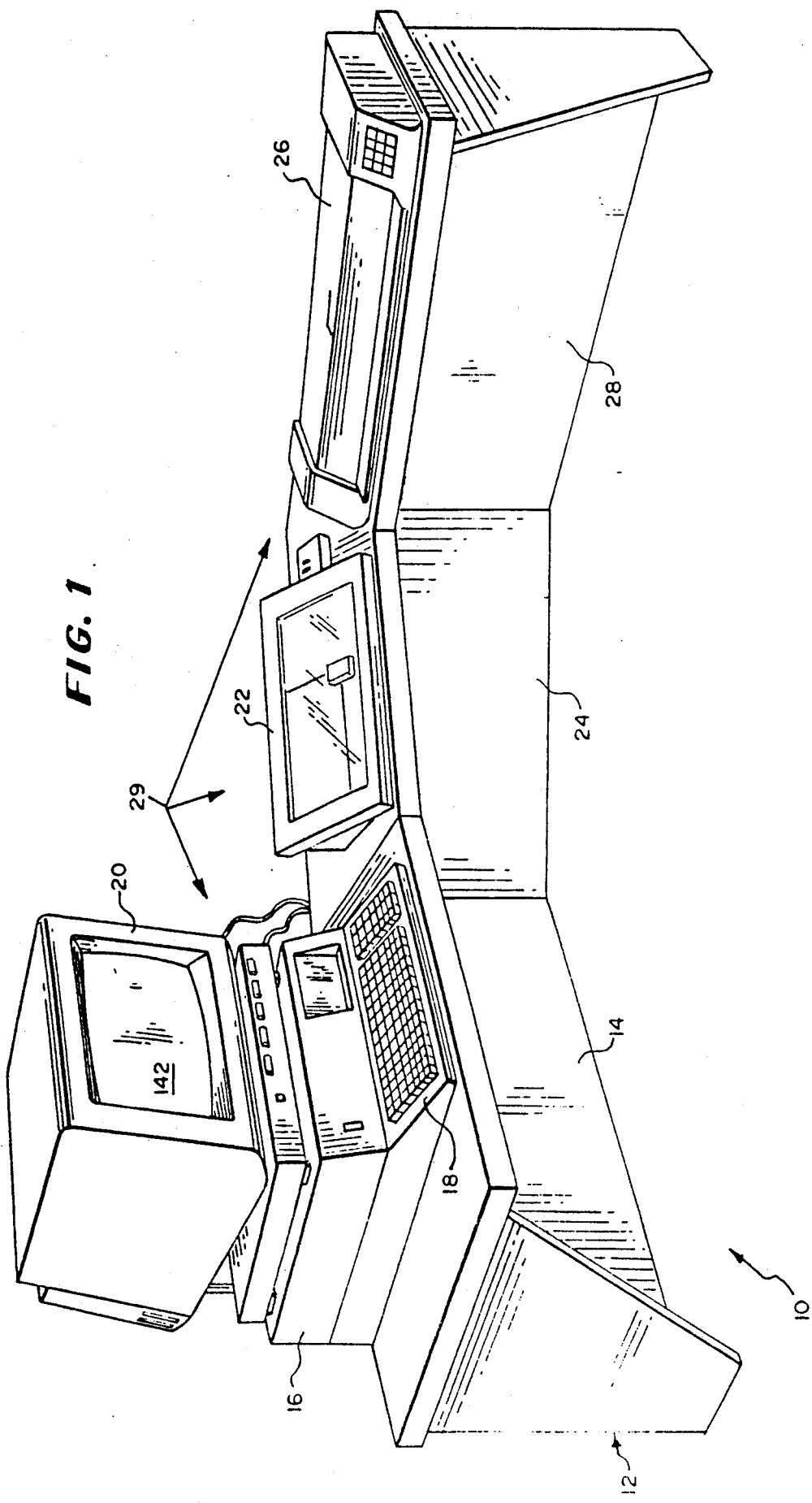
FIG. 1 is a perspective view of a Computer Aided Design (CAD) workstation utilized in practicing the method the present invention for forming the panel assembly of the present invention.

Referring now to the drawings in greater detail, there is illustrated in FIG. 1 a Computer Aided Design (CAD) work station 10 including a three section bench 12 having disposed on one section 14, a computer 16, a keyboard 18, and a terminal 20, a digitizer 22 mounted on a middle section 24 and a plotter 26 situated on a third section 28. The computer 16, keyboard 18, terminal 20, digitizer 22 and plotter 26 form a CAD system 29.

Figure 2:
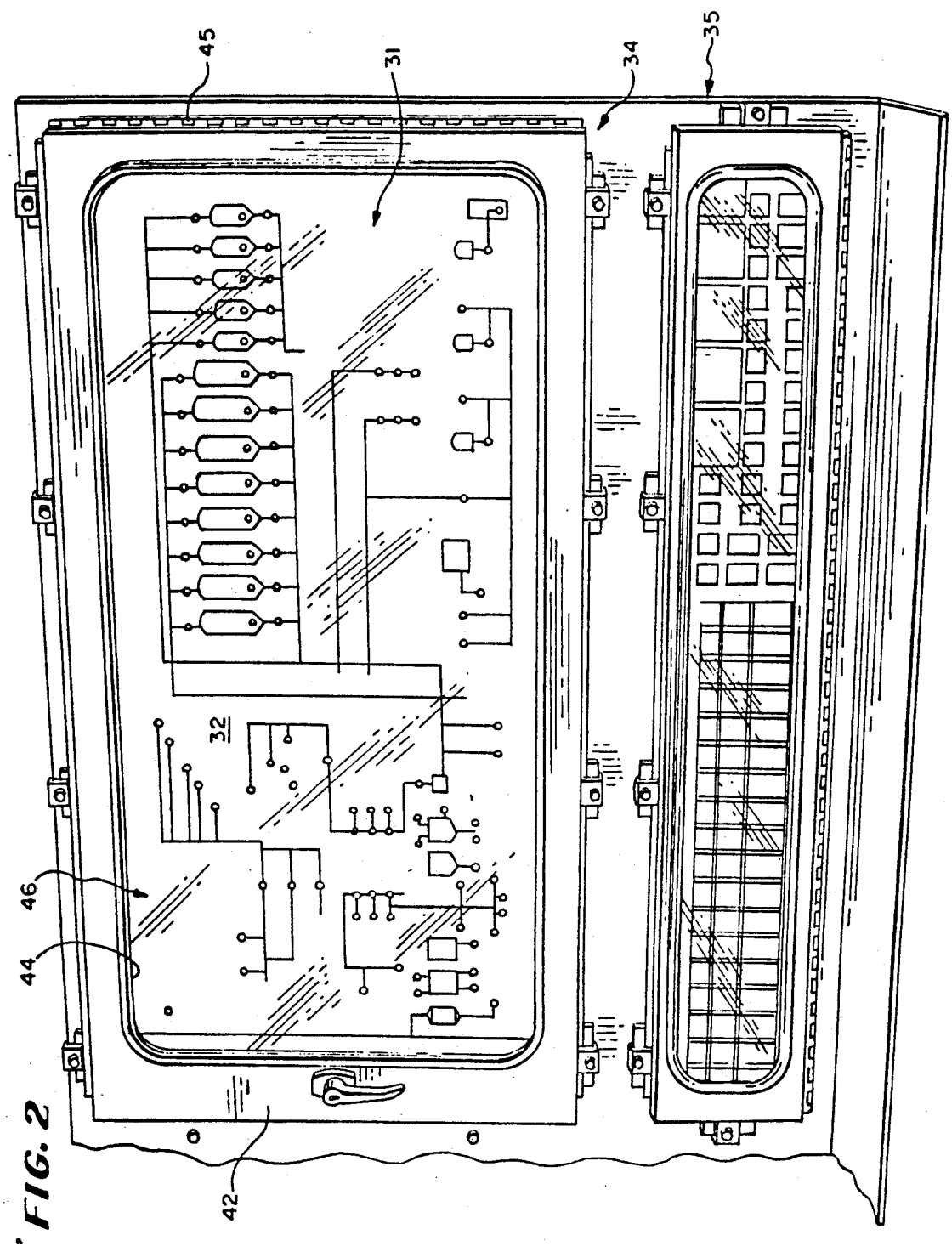
FIG. 2 is a fragmentary perspective front elevational view of the panel assembly constructed according to the teachings of the present invention.
Figure 6:
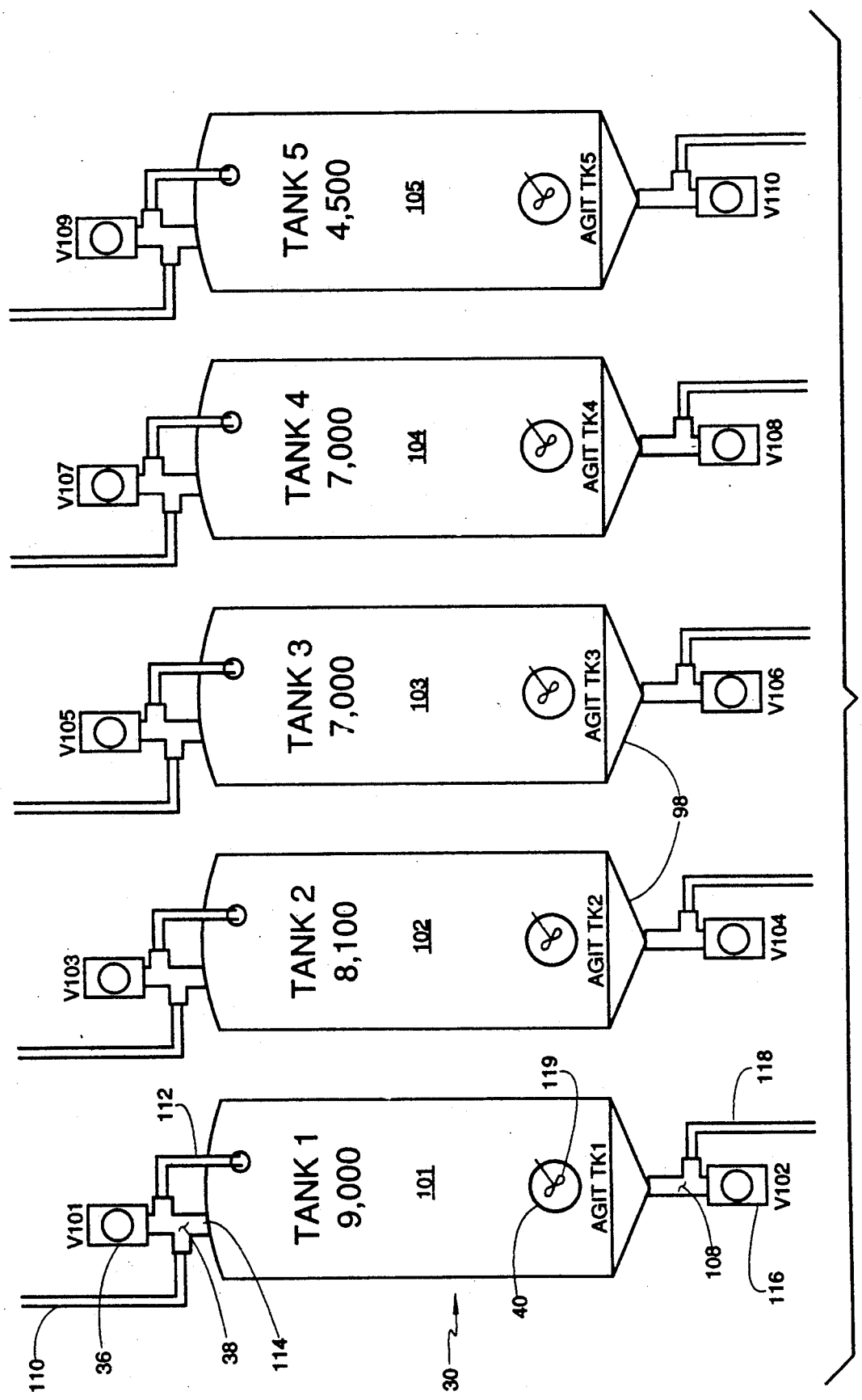
FIG. 6 is a plan view of a portion of the overlay shown in FIGS. 2 and 5.

According to the teachings of the present invention, the CAD system 29 is utilized by an operator for creating a layout 30 (a portion of which is shown in FIG. 6) for a panel overlay, such as the overlay 31, shown in FIG. 2 which shows, for example, a layout of a liquid processing system 32, (FIG. 2) which forms part of a panel assembly 34 in a control housing unit 35 and which has certain points or circle areas illuminated, such as for the purpose of identifying the location of a solenoid operated inlet 36 for operating a solenoid valve 38 or a stirring unit 40 as shown in FIG. 6.

Referring now to FIGS. 2–5, the panel assembly 34 constructed according to the teachings of the present invention includes an outer door 42 having a window 44 with a glass lens 46 mounted in the window 44. The door 42 is hingedly connected by a hinge 45 to the control unit housing 35 as shown in FIG. 2.

As shown in FIG. 2, the panel assembly 34 includes the overlay 31 which is located behind the window lens 46 and which includes a schematic flow diagram of fluid process lines, valves, mixers, dispensers, and fluid tanks.

Figure 5:
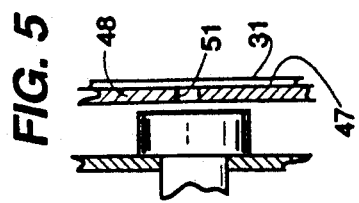
FIG. 5 is a fragmentary vertical sectional view of an overlay, the outer panel and the inner panel of the panel assembly with a window lens of the assembly not shown.

The overlay 31 is positioned adjacent to and is detachably mounted to the front face 47 of an outer panel 48 of the panel assembly 34. This construction is shown in FIG. 5 which is a fragmentary sectional view of the panel assembly 34.

Figure 3:
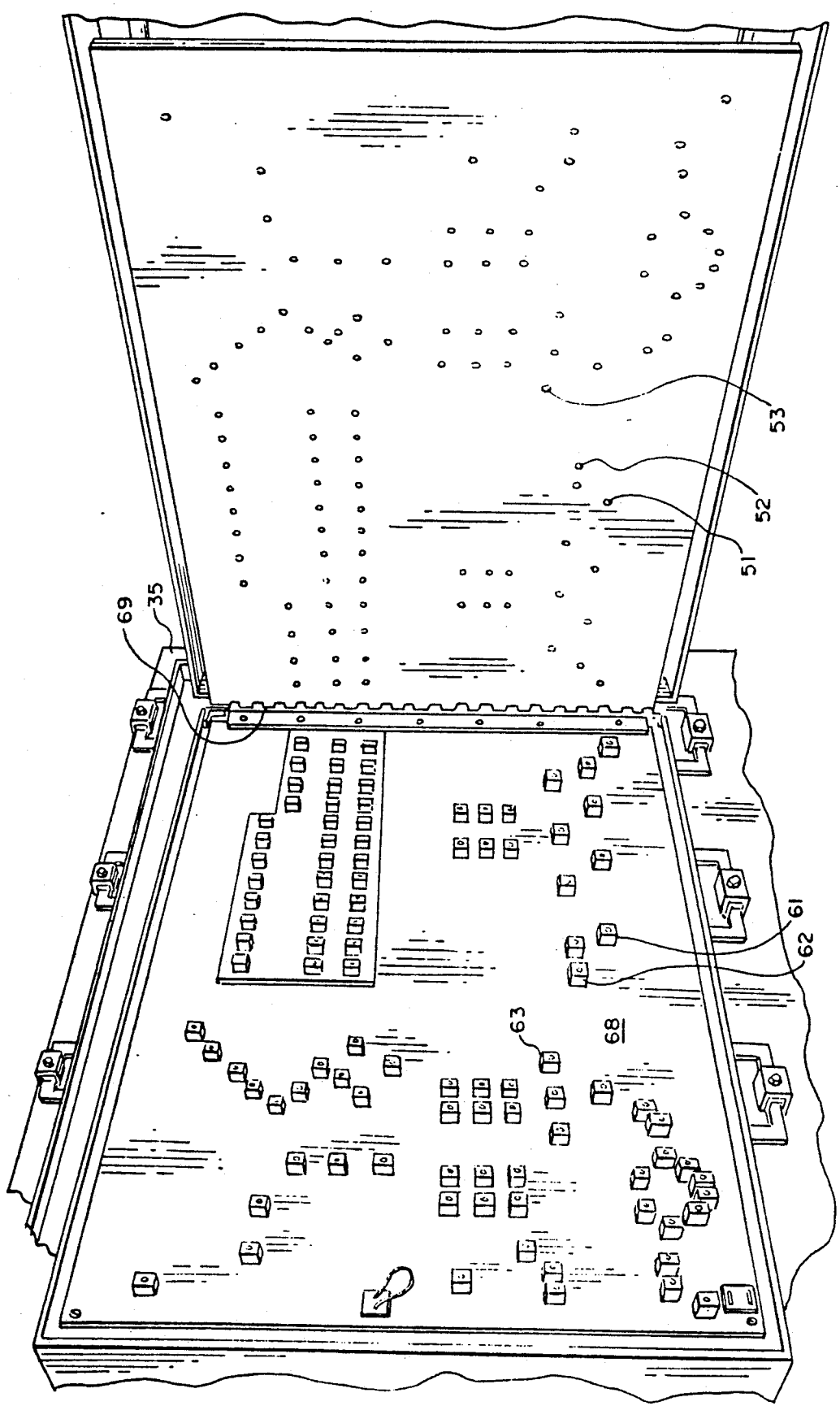
FIG. 3 is a fragmentary perspective view of the panel assembly shown in FIG. 2 with a door and outer panel of the panel assembly rotated outwardly about a hinge from an inner panel of the assembly.

According to the teachings of the present invention, this outer panel 48 has a number of holes therein, e.g., holes 51, 52, 53, through each of which a light from a lamp, e.g. lamps 61, 62, 63, mounted on an inner panel 68 shown in FIG. 3, is projected to illuminate a specific area on the overlay 31. The outer panel 48 is hingedly connected by a hinge 69 to the control unit housing 35 as shown in FIG. 3.

Figure 4:
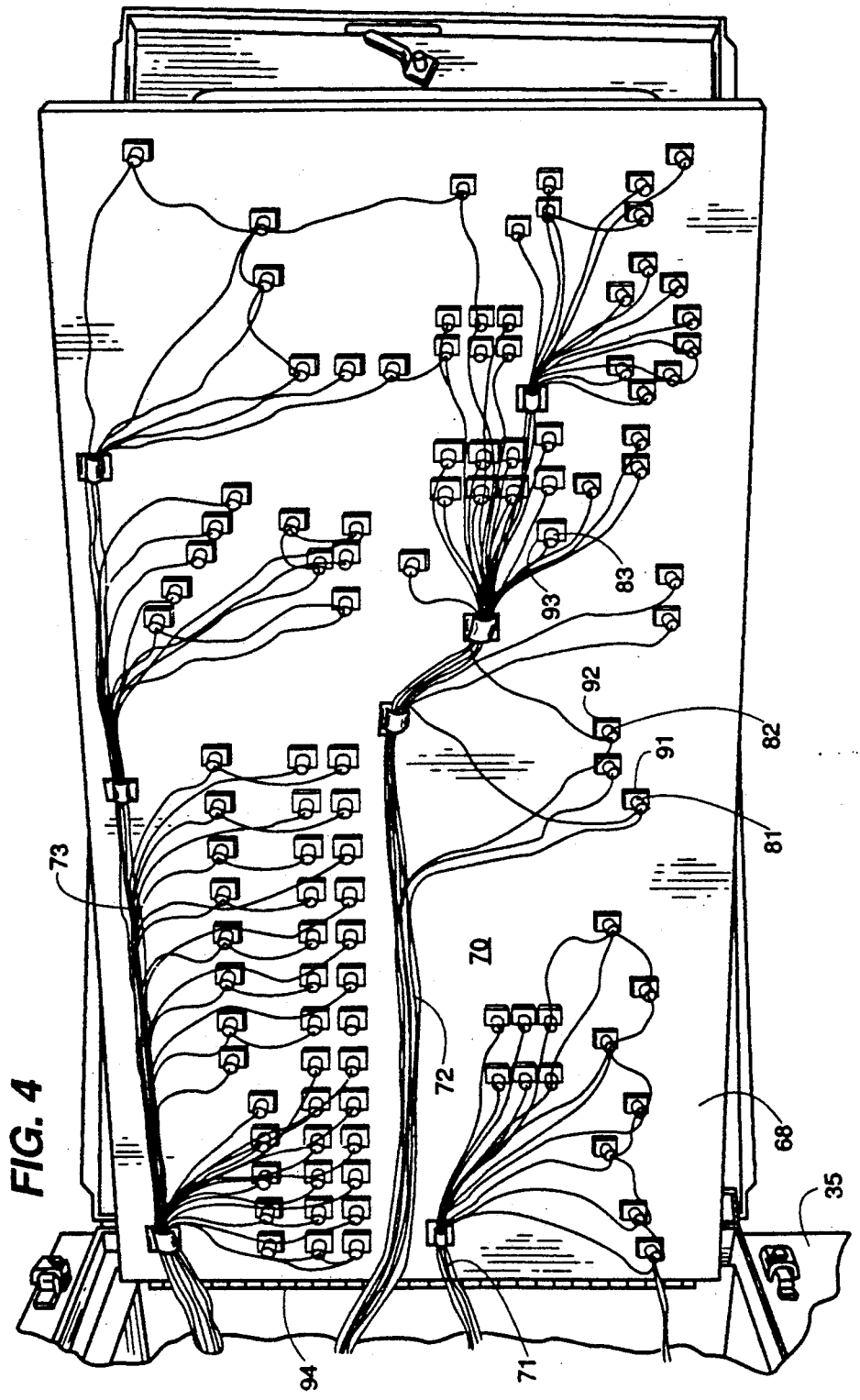
FIG. 4 is a fragmentary perspective view of the inner panel of the assembly rotated outwardly about a hinge from a cabinet in which it is mounted.

As shown in FIG. 3, behind the outer panel 48 is the inner panel 68 which has mounted thereon the plurality of lamps, e.g. lamps 61–63, at specific, discrete locations. As shown in FIG. 4, on a backside 70 of the inner panel 68, several wire harnesses are mounted, e.g., harnesses 71, 72, 73, each including insulated wire conductors. The wire conductors in the harnesses, e.g., harnesses 71, 72 and 73, are connected to individual lamp assemblies, e.g., lamp assemblies 81, 82, 83, that are mounted on the backside 70 of the inner panel 68 as shown in FIG. 5.

The inner panel 68 has holes therein (hidden from view) in which the lamps, e.g., lamps 61–63 are mounted. Each lamp is held to the panel 68 by a plate shaped bracket, e.g., one of brackets 91, 92, 93, each of which is located on the backside 70 of the inner panel 68, as shown in FIG. 4, and forming part of one of the lamp assemblies, e.g., lamp assemblies 81, 82, 83. The inner panel 68 is hingedly connected by a hinge 94 to the control unit housing 35 as shown in FIG. 4.

FIG. 6 is an enlarged view of a portion 98 of the layout 30. This portion 98 of the layout 30 is a typical representation of five tanks 101–105 each including one of the inlet valves 38 and an outlet valve 108, only the first tank 101 of which will be described in detail.

A supply line 110 is connected to the inlet valve 38 which is connected to a spray inlet line 112 leading to the tank 101 and a direct inlet through valve outlet 114. Connected to the inlet valve 38 is the solenoid 36 for operating the valve 38. If the solenoid 36 is off, the product in line 110 is delivered directly into the tank 10 through valve outlet 114. If the solenoid 36 is on, the path of the product in line 110 is to inlet line 112 which is connected to a spray apparatus (not shown) inside the tank 101 for cleaning the walls of the tank 101.

At the lower end of the tank 1012 is the outlet valve 108 which is operated by a solenoid 116 and which is connected to an outlet line 118. Typically, the open position of each valve 38, 108 is indicated by illuminating (with one of the lamps) the solenoid 36 or 116. The valves 38 and 118 are individually numbered V101–V110.

Each tank 101–105 includes an agitator or stirrer which is illustrated graphically at 119 on the layout 30. When the agitator 119 is energized and operating, this is indicated on the layout 30 by illuminating the circle 40 encircling the agitator symbol 119.

Figure 7:
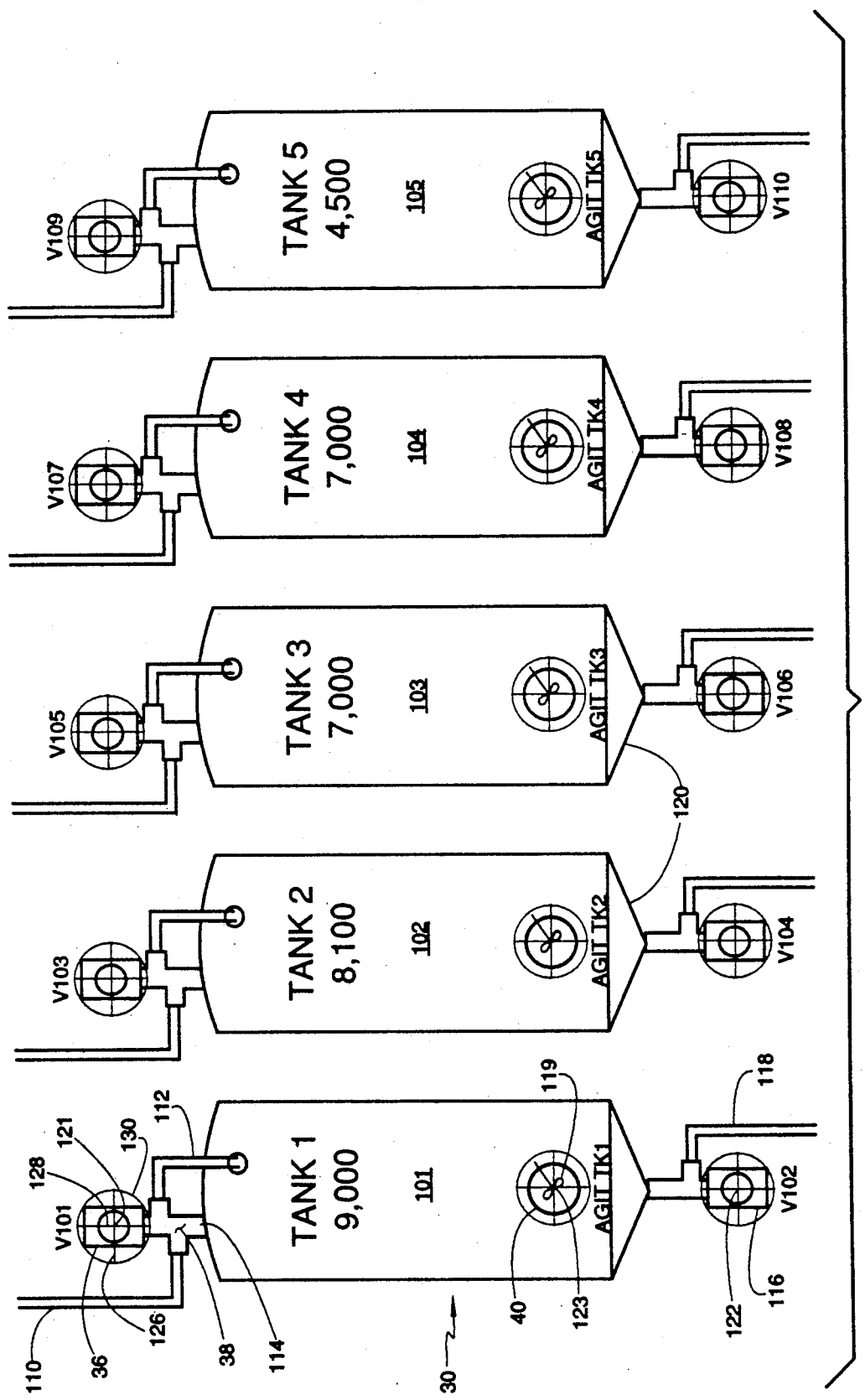
FIG. 7 is a plan view of the overlay shown in FIG. 6 with center cross hairs shown for the points or circular areas on the panel overlay to be illuminated.

In FIG. 7 there is illustrated a portion 120, similar to portion 90 of the layout 30 shown in FIG. 6 with centers, e.g., centers 121, 122, 123 shown drawn over the areas to be illuminated on the layout 30. Each center 121, 122, 123 includes cross hairs 126, 128 in a circle 130. For example, in tank 101, center 121 is situated over solenoid 36. Solenoid 116 has Center 122 thereover. Similarly, the circle 40 and the agitator symbol 119 has center 123 thereover.

A layout 140 of centers, e.g., centers 121, 122, 123, each including a circle 130 and cross hairs 126, 128, is shown in FIG. 8. These centers 121, 122, 123 are centers for drilling holes in the outer panel 48 and the inner panel 68.

The layouts 30 and 140 shown in FIGS. 6 and 8 are generated with the aid of the computer 16 and are computer aided design. Each design is laid out by using the digitizer 22 and such design appears on a screen 142 of the terminal 20. The design layout is then printed as layout 30 with the plotter 26 shown in FIG. 1. Similarly, the layout 140 of centers 121, 122, 123 or circles 130 with cross hairs 126, 128 shown in FIG. 8 are laid out with the digitizer 22 and shown on the screen 142 of the terminal 20. This layout 140 defines an overlay of centers 121, 122, 123 which is stored in the computer 16 and can be overlayed on the layout 30 shown in FIG. 6 as shown in FIG. 8.

The CAD system 29 shown in FIG. 1 enables an operator to easily make up a layout or template of centers as shown in FIG. 8 from the overall layout of process lines shown in FIG. 6 and then superimpose the layout of centers, e.g., centers 121, 122, 123, shown in FIG. 8 over the process layout in FIG. 6 to generate the composite layout shown in FIG. 7.

By using CAD system 29, an operator can generate a computer design or layout 30 of a fluid schematic diagram for a process which then can be utilized as an outer overlay 30 on the front or outer face 47 of the outer panel 48.

Then, the layout 140 of centers can be generated separately from the layout 30, or in conjunction with the layout 30, and placed as an overlay on the layout 30. More specifically, the layout 140 of centers can be generated separately and placed on the outer panel 48 and/or on the inner panel 68 for facilitating the drilling of illumination holes, e.g., holes 51, 52, 53, in the outer panel 48 or mounting holes 61, 62, 63 for lamps in the inner panel 68.

The completed panel assembly 34 can then be shipped to an installation for use while the computer program for the design is retained by the manufacturer of the panel assembly 34. This is very important since at a later date when changes are made in the fluid process system, there is no need to replace the panel assembly 34 with a new panel assembly. In the past, this was often necessary and required great expense in that the existing panel assembly 34 was rendered obsolete and had to be thrown away, resulting in a loss of the investment in the original control panel 34 and sometimes even in the control unit 35.

With the panel assembly 34 of the present invention and the method of constructing same, it is only necessary to generate a new layout 30 for a new overlay 31 for the outer panel 48 showing the new fluid connections and the areas which it is desired to illuminate in that new layout, such as new valve positions, etc. Also, of course, the areas which were formerly illuminated and which are not now to be illuminated in the revised fluid process system will be deleted from the layout and more particularly from the computer program for the layout. Then, a new layout 30 for a new overlay 31 is generated as well as a new layout 140 of centers. These layouts 30 and 140 are then shipped to the user so that the user can then simply remove the old overlay 31 on the old control panel assembly, place a new overlay 140 of centers on the inner panel 68 and outer panel 48, mark the positions where holes are to be plugged and where new holes are to be made, drill the new holes, dismount the eliminated lamp assemblies, mount the new lamp assemblies and then place a new overlay 30 over the front face 47 of the outer panel 48 to create a modified or revised panel assembly 34.

As noted above, this is done without having to dispose of the panels 48 and 68 of the old panel assembly 34 and create a whole new panel assembly 34. Rather, only a simple computer generated revised or modified design is required using the CAD system 29.

The panel assembly 34 of the present invention and the method for making same enable a manufacturer of panel assemblies to realize significant savings for customers since the program for generating the panel assembly can be stored on a floppy disk and saved for many years until such time as it is necessary to modify the old panel assembly 34 and without the need for redoing all the work in creating the basic process layout 30 for the overlay 31 and panel assembly 34 incorporating same.

It will be apparent from the foregoing description that the panel assembly 34 of the present invention and method for making same, described above, have a number of advantages, some of which have been described above and others of which are inherent in the invention.

Also it will be apparent that the panel assembly 34 described above and the method for making same described above can be modified without departing from the teachings of the invention. According the scope of the invention is only to be limited as necessitated by the accompanying claims.

We claim:

1. A method for constructing a panel assembly for a control unit comprising the steps of: creating a layout of the system to be controlled in a computer-aided-design system; providing in the layout circle areas for elements of the system to be illuminated to indicate a certain operating mode of the element; creating an overlay of centers for each of the circle areas in the computer-aided-design system; storing in a memory of the computer-aided-design system the layout of the system and a layout of the centers; printing a layout for an overlay of the system to be controlled to a desired scale; printing a layout of the centers to the desired scale; placing the layout of the centers adjacent an outer panel for marking centers thereon; drilling holes at the centers; placing the layout of centers over an inner panel for identifying the centers of the holes to be drilled; drilling holes in the inner panel; mounting light emitting means in the holes drilled in the inner panel; placing the overlay of the system on the outer face of the outer panel with the circle areas thereof in alignment with holes drilled through the outer panel; and storing the graphical representations of the layout of the system and the layout of the centers in the memory of the computer-aided-design system.

2. A method for constructing a panel assembly for a control unit comprising: a control unit housing; an inner panel having a back side and an outer face and being hingedly mounted at one side edge to said control unit housing, said inner panel having a plurality of openings formed therethrough; light emitting means mounted in said openings for projecting light outwardly from the outer face of said inner panel; wire conductor means connected on the back side of said inner panel to the light emitting means and adapted to be connected to a source of electric power; an outer panel having an outer face and an inner face and being hingedly connected along one side thereof to said control unit housing, said outer panel having openings therethrough arranged to be in alignment with said light emitting means mounted in said openings of said inner panel; and said layout of said system being mounted on the outer face of said outer panel and having designated areas over at least some of said openings in said outer panel identifying certain elements of the system illustrated in the layout that have different operating modes, which designated areas are to be illuminated to indicate particular operating modes of the elements in the layout of the system shown on said outer face of said outer panel, said method comprising the steps of:

(a) creating a layout of the system to be controlled in a computer-aided-design system:

(b) providing in said layout circle areas for elements of the system to be illuminated to indicate a certain operating mode of the element;

(c) creating an overlay of centers for each of the circle areas in the computer-aided-design system;

(d) storing in a memory of the computer-aided-design system the layout of the system and a layout of the centers;

(e) printing a layout for an overlay of the system to be controlled to a desired scale;

(f) printing a layout of the centers to the desired scale;

(g) placing the layout of the centers adjacent said outer panel for marking centers thereon;

(h) drilling holes at the centers;

(i) placing the layout of centers over said inner panel for identifying the centers of holes to be drilled;

(j) drilling holes in the inner panel;

(k) mounting said light emitting means in the holes drilled in the inner panel;

(l) placing the overlay of the system on the outer face of the outer panel with circle areas thereof in alignment with the holes drilled through the outer panel; and (m) storing the graphical representations of the layout of the system and the layout of centers in the memory.

3. A method for modifying a panel assembly created by the method defined in claim 1 including the further steps of:

(n) retrieving from the memory of the graphical layout of the system to be controlled and the layout of the centers;

(o) modifying the layout to increase or decrease the circle areas to be illuminated for indicating a status of an element of the system to be controlled; and (p) generating a modified layout of centers which eliminates each center for a removed element and adds a center for each added element; and, (q) repeating method steps (e) to (m).

4. The method of claim 3 including the step of plugging the holes in the inner and outer panels where elements have been removed from the computer stored graphic representation of the layout of the control system and the layout of the centers.

5. A method for modifying a panel assembly comprising: a control unit housing; an inner panel having a back side and an outer face and being hingedly mounted a one side edge to said control unit housing, said inner panel having a plurality of openings formed therethrough; light emitting means mounted in said openings for projecting light outwardly from the outer face of said inner panel; wire conductor means mounted on the back side of said inner panel to the light emitting means and adapted to be connected to a source of electric power; an outer panel having an outer face and an inner face and being hingedly connected along one side thereof to said control unit housing, said outer panel having openings therethrough arranged to be in alignment with said light emitting means mounted in said openings of said inner panel; and said layout of said system being mounted on the outer face of said outer panel and having designated areas over at least some of the said openings in said outer panel identifying certain elements of the system illustrated in the layout that have different operating modes, which designated areas are to be illuminated to indicate particular operating modes of the elements in the layout of the system shown on said outer face of said outer panel, said method being performed to include additional elements or to exclude original elements utilizing the original inner and outer panels, and including the steps of: providing a new overlay of a system which is to be mounted on said outer face of said outer panel; forming additional openings in said inner and outer panels for mounting light emitting means and for transmitting light, respectively, to circle areas identifying new elements being added to the layout of the system; mounting light emitting means in said new openings in said inner panel; and mounting the new layout on said outer face of said outer panel.

6. The method of claim 5 including the step of plugging the openings in the inner and outer panels that were aligned with areas identifying elements which have been removed from the new layout of the system.

* * * * *

UNITED STATES PATENT AND TRADEMARK OFFICE
CERTIFICATE OF CORRECTION

PATENT NO. : 5,021,018

DATED : June 4, 1991

INVENTOR(S) : David W. Duback and James R. Vogenthaler

It is certified that error appears in the above-identified patent and that said Letters Patent is hereby corrected as shown below:

Column 3, line 56 "control housing unit 35" should be --control unit housing 35--.

Column 6, line 39 "providing in the layout circle" should be --providing in said layout circle--.

Column 7, line 48 "claim 1" should be --claim 2--.

Signed and Sealed this

Twentieth Day of April, 1993

Attest:

MICHAEL K. KIRK

*Attesting Officer*         Acting Commissioner of Patents and Trademarks